Aug. 1, 1950     O. J. ALVAREZ     2,517,073
ROTATING COFFEE MAKING APPARATUS
Filed March 12, 1947     5 Sheets-Sheet 1

INVENTOR.
Octavio Jose Alvarez
BY

Aug. 1, 1950     O. J. ALVAREZ     2,517,073
ROTATING COFFEE MAKING APPARATUS
Filed March 12, 1947     5 Sheets-Sheet 2

INVENTOR.
Octavio Jose Alvarez
BY

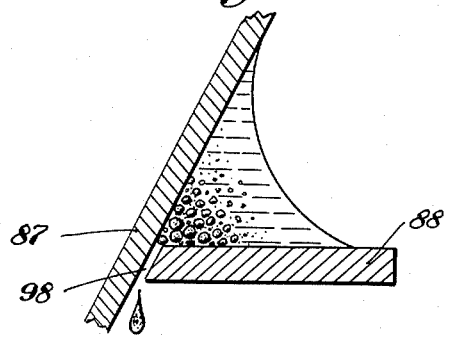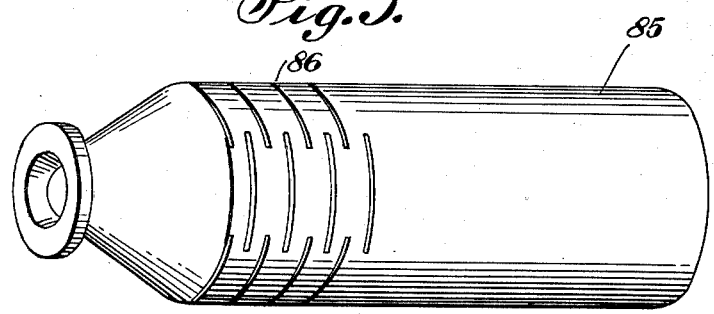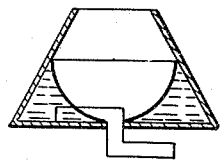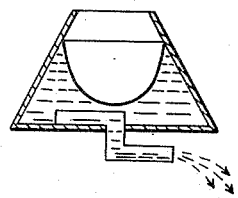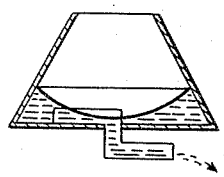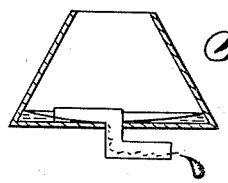
INVENTOR.
Octavio Jose Alvarez
BY Aug. 1, 1950
O. J. ALVAREZ
2,517,073
ROTATING COFFEE MAKING APPARATUS
Filed March 12, 1947
5 Sheets—Sheet 4
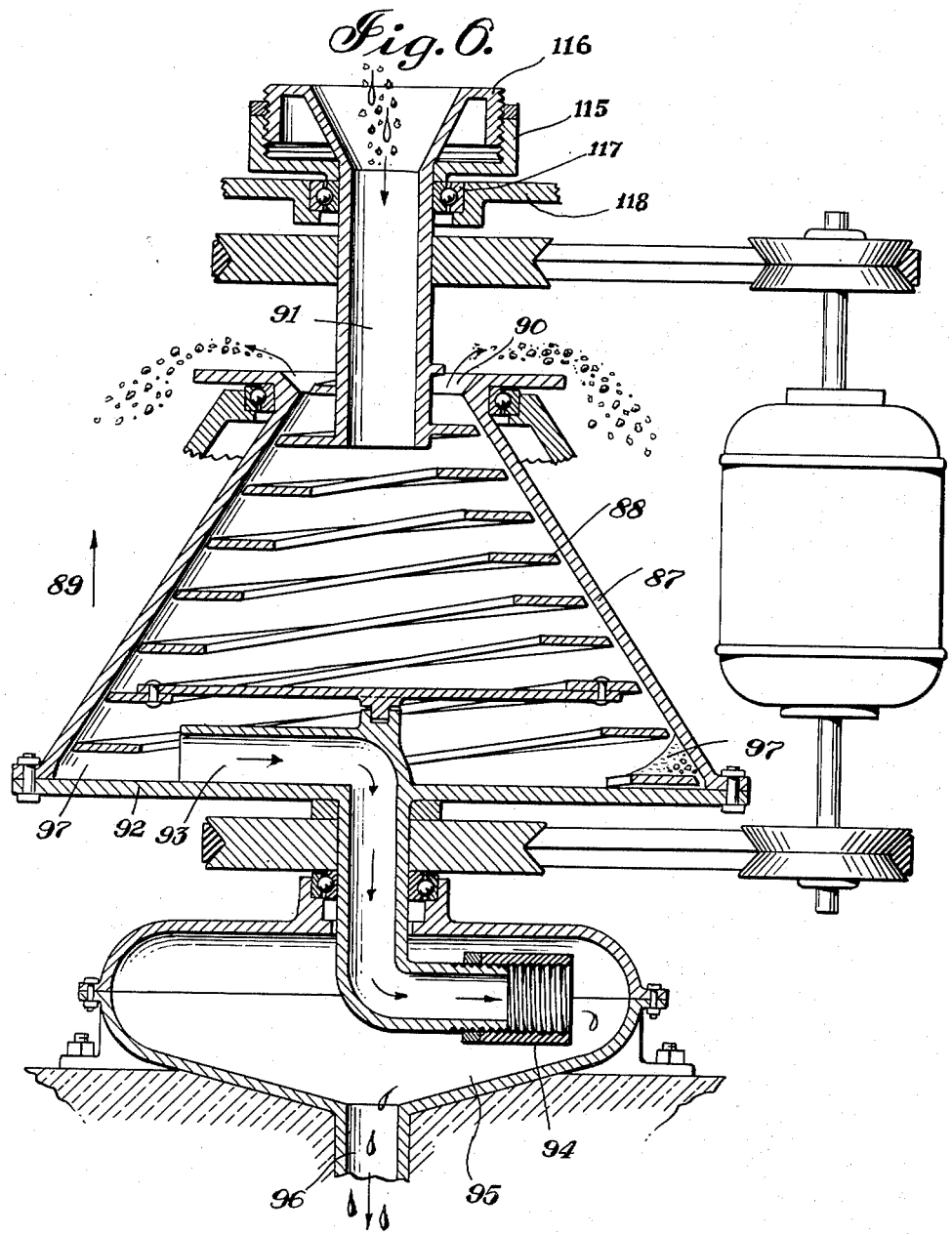
Fig. O.
INVENTOR.
Octavio Jose Alvarez
BY Aug. 1, 1950   O. J. ALVAREZ   2,517,073
ROTATING COFFEE MAKING APPARATUS
Filed March 12, 1947   5 Sheets-Sheet 5
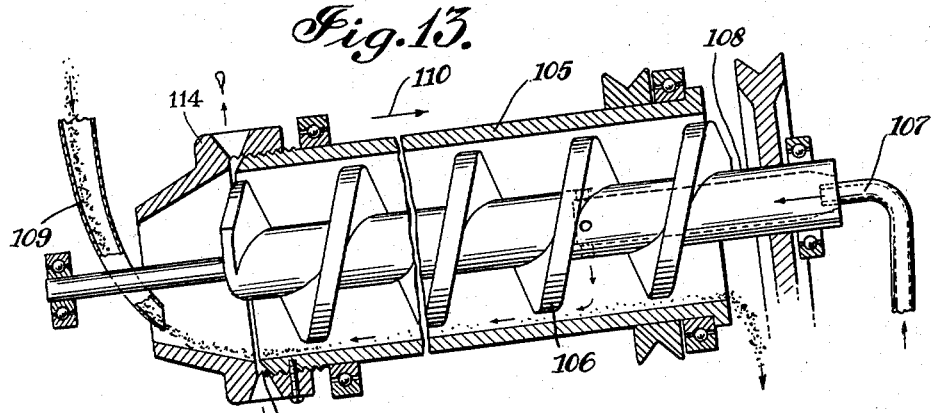
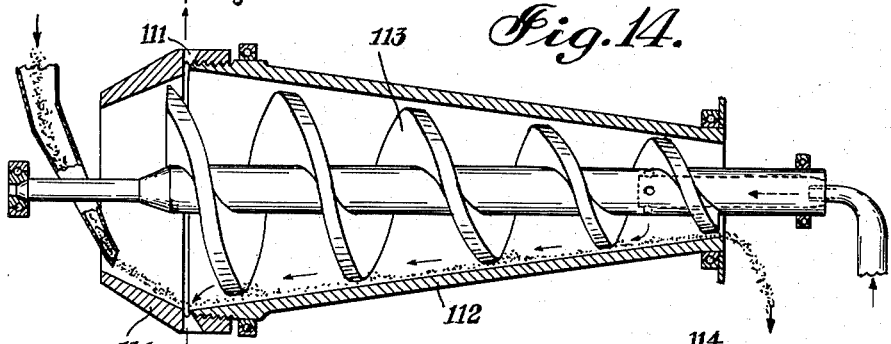
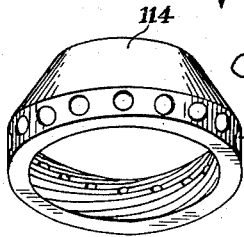
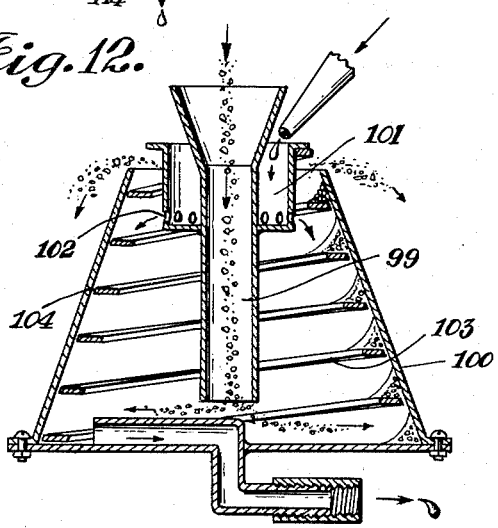
INVENTOR.
Octavio Jose Alvarez
BY Patented Aug. 1, 1950

2,517,073

UNITED STATES PATENT OFFICE 2,517,073

ROTATING COFFEE-MAKING APPARATUS

Octavio Jose Alvarez, New York, N. Y., assignor, by mesne assignments, of one-fourth to Maria De Reitzes-Marienwert and three-fourths to Octavio J. Alvarez, both of New York, N. Y.

Application March 12, 1947, Serial No. 734,173

4 Claims. (Cl. 99—289)

My present invention relates to coffee making apparatus and more particularly to coffee making apparatus adapted to deliver a continuous stream of coffee.

It is an object of my present invention to provide a coffee making apparatus constructed so as to be adapted to work continuously, namely, to deliver continuously fresh coffee liquid and to remove at the same time the extracted coffee grounds.

It is another object of my present invention to provide an automatic coffee making machine combined with grinding means for grinding the coffee beans.

It is a further object of my present invention to provide an automatic coffee making machine of the above type with automatic means so as to properly regulate the operating conditions, for instance, the temperature of the water used for the coffee, the speed of grinding and delivering of the ground coffee and the operation of the motor means operating the entire machine.

Still a further object of my present invention consists of a coffee making apparatus in which the ground coffee is transported continuously through an extracting chamber in which it is intimately mixed with water.

Still another object of my present invention consists of a coffee making apparatus of the above defined type in which a stream of water is continuously led through an extracting chamber in which it is intimately mixed with ground coffee continuously passing through this chamber.

Still another object of my present invention consists of a coffee making apparatus of the above type in which the ground coffee-water mixture is subjected to centrifugal force so as to obtain best possible extraction of the ground coffee.

Still a further object of my present invention consists in a coffee making apparatus in which the water is forced through the ground coffee by centrifugal force.

It is also an object of my present invention to provide an automatic coffee making apparatus which is equipped with filter slots instead of filter holes and in which the liquid coffee is forced through these filter slots by centrifugal force.

Still a further object of my present invention consists in a coffee making apparatus permitting a repeated filtering of the coffee liquid through the coffee grounds in a continuous operation.

Furthermore, it is also an object of this invention to regulate the degree of compression of the coffee grounds through which the hot water is forced during preparation of the coffee liquid automatically in a continuous operation.

It is still a further object of my present invention to provide a coffee making apparatus in which the compression to which the coffee grounds are subjected is in a permanently constant relation to the pressure of the hot water and coffee liquid forced through the coffee grounds during preparation of coffee liquid.

It is also an object of my present invention to provide adjusting means for adjusting the filter openings, e. g. the filter slot through which the coffee liquid is forced during its preparation.

Still another object of my present invention consists in means for purifying the coffee liquid by centrifugal action during its preparation.

Finally, it is also an object of my present invention to combine the extracting means of my new coffee making apparatus with separating means adapted so as to separate the extracted coffee grounds from the coffee liquid after preparation of the latter.

With the above objects in view, my present invention mainly consists in a coffee making apparatus comprising in combination a rotatable longitudinal—preferably cylindrical—extraction chamber, one single or several inlet openings provided at one or both ends of this extraction chamber, two or more outlet openings provided also at one or both ends of the extraction chamber, means for rotating the above defined rotatable longitudinal extraction chamber about its axis of rotation, means for continuously supplying a stream of ground coffee through the above mentioned single inlet opening or one of the several inlet openings into the extraction chamber, means for continuously supplying a stream of hot water through the same single or one of the several inlet openings into the extraction chamber, a rotatable conveyor means, preferably a rotatable conveyor screw, arranged within the extraction chamber coaxially with the same, and means for rotating this rotatable conveyor means about its axis of rotation at a speed being different from the speed of rotation of the rotatable longitudinal extraction chamber.

Preferably, the speed of rotation of the rotatable conveyor means, e. g. the conveyor screw, is slightly greater than the speed of rotation of the rotatable extraction chamber so that the rotatable conveyor screw is intimately mixing the hot water with the ground coffee and transporting at least the ground coffee through the extraction chamber in longitudinal direction thereof, transforming it during such transportation into coffee grounds and removing these coffee grounds from the extraction chamber through one of the above defined outlet openings; simultaneously, the hot water is transformed into coffee liquid and this coffee liquid is then emitted from the extraction chamber through another of the outlet openings.

Various modifications and embodiments of automatic coffee making apparatus of the type proposed by me are possible: Thus, for instance, the extraction chamber might be arranged so as to have an inclined or vertical axis of rotation; in this case, I found it advisable to arrange the inlet opening or openings for the ground coffee and the hot water at the upper end of the extraction chamber and one of the outlet openings, namely the outlet opening for the coffee grounds, at the upper end and the other outlet opening, namely the outlet opening for the coffee liquid, at the lower end of the extraction chamber.

In case the extraction chamber has a horizontal axis of rotation, it is possible to arrange both inlet openings at one end and both outlet openings at the other end of the extraction chamber. However, in order to increase the extraction rate, it is possible to introduce the ground coffee and the hot water at opposite ends of the extraction chamber and to have them move within the extraction chamber in opposite directions, so that the coffee liquid is emitted from the extraction chamber at that end at which the ground coffee is entering this chamber, and the coffee grounds are leaving the extraction chamber at that end at which the hot water is entering the same.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a perspective view of a modified extraction vessel for a coffee making apparatus of the type shown in Figs. 1 to 3;

Fig. 6 is a vertical section through a modified coffee making apparatus, rotating about a vertical axis;

Fig. 7 is a vertical section through a detail of the coffee making apparatus shown in Fig. 6;

Figs. 8 to 11 are schematic views of the coffee making apparatus shown in Figs. 6 and 7 and various times of operation;

Fig. 12 is a vertical section through a modified coffee making apparatus rotating about a vertical axis and being similar to the coffee making apparatus shown in Figs. 6 and 7;

Fig. 13 is a vertical section through the main parts of a modified coffee making apparatus with an inclined axis of rotation, similar to the coffee making apparatus shown in Figs. 1 and 5;

Fig. 14 is a vertical section through the main parts of a modified coffee making apparatus provided with a conical extraction vessel and rotating about a horizontal axis, similar to the coffee making apparatus shown in Figs. 1, 5 and 13; and Fig. 15 is a perspective view of part of the extraction vessels forming part of the apparatus shown in Figs. 13 and 14.

Figure 1:
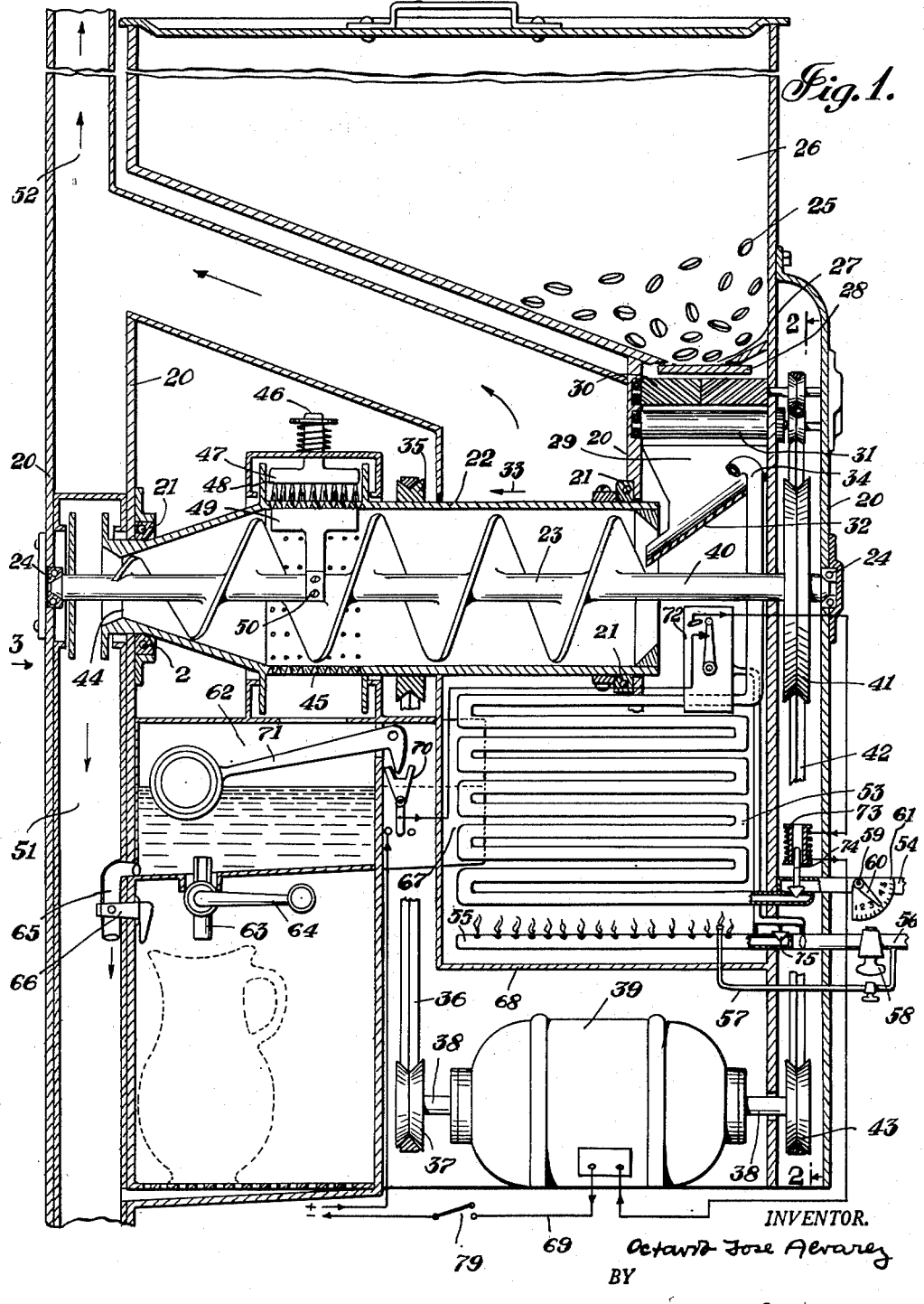
Fig. 1 is an elevational section through a coffee making apparatus according to my present invention.

The coffee making apparatus shown in Figs. 1 to 3 and 5 comprises as main elements a frame 20 freely rotatably supporting by means of the ball bearing 21 the rotatable extraction vessel 22. Furthermore, my apparatus includes a rotatable conveyor screw 23, also freely rotatably supported at its both ends by means of ball bearings 24 which in turn are secured in well known manner to frame 20.

The coffee beans 25 are stored in the hopper-like container 26. This container 26 is provided at its bottom with an outlet opening 27 which can be closed and opened by means of the shutter member 28. This shutter member 28 is provided with an operating handle or the like not shown in the drawings so as to enable manual operation of the same.

Under the outlet opening 27 a tubular member 29 is provided. Within this tubular member 29 two grinding rollers 30 are arranged and under these grinding rollers I provide two additional smooth rollers 31 which prevent the steam created by the hot water from penetrating the grinding rollers 30 and the coffee beans in hopper 26.

It is possible to arrange these additional smooth rollers 31 so that they do not exert any pressure upon the ground coffee passing between them. However, I found it advisable in some cases to arrange these smooth rollers 31 in such a manner that they exert a great pressure on the ground coffee and compress the same so as to form compressed flakes consisting of the ground coffee delivered by the grinding rollers 30. I have found that by using coffee flakes of this type I am able to greatly increase the extraction rate during preparation of the coffee liquid.

The ground coffee after passing through the rollers 31 drops on the inclined slide-like partition wall 32 and slides along the same into the rotatable extraction vessel 22 in which it is transported by means of the conveyor screw 23 in direction of arrow 33.

The hot water, which is heated as will be described farther below in detail, is delivered through the hot water pipe 34 and mixed with the ground coffee during introduction of the same into the extraction vessel.

Both the extraction vessel 22 and the conveyor screw 23 are rotated: For rotating the extraction vessel 22 I provide motion transmitting means consisting of the pulley 35 mounted on the extraction vessel 22, the pulley belt 36 and pulley 37 mounted on the shaft 38 of the electric motor 39. Similarly, the shaft 40 of the conveyor screw 23 is rotated by means of the pulley 41 mounted thereon, the driving belt 42 and the pulley 43 mounted also on shaft 38 of the motor 39.

The size of the pulleys is chosen so that during operation of the motor 39 the shaft 40 and the conveyor screw 23 are rotated at a slightly greater speed than the extraction vessel 22. Particularly good results were obtained with apparatus in which the extraction vessel 22 made one hundred rotations while the conveyor screw turned one hundred and one times.

At the outlet end of the extraction vessel 22 I provide the outlet opening 44 for the coffee grounds and at a slight distance from this outlet opening I provide the outlet holes 45 for the coffee liquid.

In order to keep the outlet holes 45 clean, I arrange near the extraction vessel stationary cleaning means consisting of a water conduit 46 provided with the nozzle 47 and small holes 48 in this nozzle through which hot water can be sprayed against the outer surface of the extraction vessel 22 so as to clean the outlet holes 45.

Furthermore, in order to prevent clogging of these outlet holes, I provide within the extraction vessel 22 a scraper member 49 secured at 50 to the shaft 40 of the conveyor screw 23 and moving along the inner surface of that part of the extraction vessel in which the outlet holes 45 are arranged.

Figure 3:
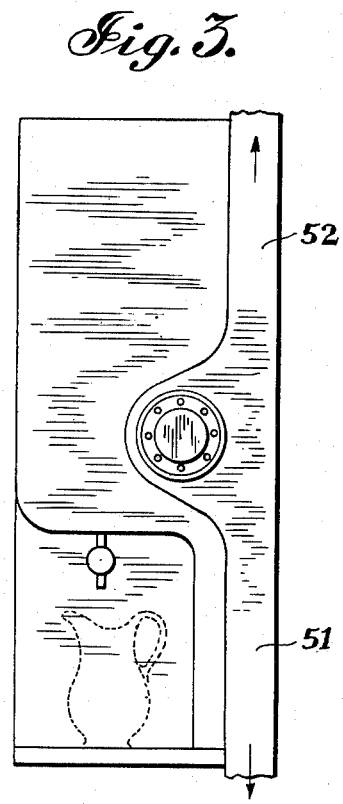
Fig. 3 is a partial end view of my new coffee making apparatus shown in Figs. 1 and 2, seen in direction of arrow 3 of Fig. 1.

The coffee grounds emitted through the outlet openings 44 drop down through the outlet tube 51, as clearly shown in Figs. 1 and 3. This outlet tube 51 is extended upwards and connected with the exhaust tube 52 for the hot air created by the means for heating the water necessary for preparation of the coffee.

For heating the water before introduction of the same into the extraction vessel, I connect the hot water pipe 34 with the water coil 53 which in turn is connected with cold water conduit 54. Under this coil 53 I arrange the gas heater 55 connected with the gas conduit 56. This gas heater is provided with a pilot light arrangement 57 of well known type.

Furthermore, I provide in the gas conduit 56 the gas valve 58, as clearly shown in Fig. 1.

In order to regulate the amount of hot water, I provide first of all manually operable means, e. g. a water valve 59 equipped with the operating spigot 60. Behind this spigot 60, the indicating scale 61 is mounted, indicating how far the valve 59 is open.

The coffee liquid emitted through the outlet holes 45 drips into the coffee container 62 which is provided at its bottom with an outlet conduit 63 which can be opened and closed by means of spigot 64. Furthermore, a drainage tube 65 is arranged at the lowermost point of the coffee container 62. This drainage tube 65 is connected with the outlet tube 51 and can be closed or opened by means of the spigot 66.

I wish to note that the coffee container 62 reaches—as indicated at 67—into the heating chamber 68 surrounding the water coil 53. Thus, the coffee container is permanently heated if and when the gas heater 55 is in operation.

In order to obtain proper automatic adjustment of the heating means and delivery of proper amounts of hot water and ground coffee, I provide automatic switch means adapted to start and to stop operation of the heating means and/or the motor 39, whenever needed. Furthermore, I provide automatic valve means 74 for opening and closing the cold water conduit 54 as will be described farther below in detail.

These switch means consist of the following elements:

First, I provide in the electric circuit 69 of the electric motor 39 an electric switch 70 operated by means of the float 71 arranged in the coffee container 62 in such a manner as to close the switch when the coffee level in the container 62 drops below a predetermined lower level and to open this switch and thus interrupt the circuit 69 whenever the coffee in the container 62 reaches a predetermined upper level.

Furthermore, I provide thermostatic switch means 72 arranged so as to close the circuit 69, whenever the temperature of the water at the upper end of the water coil 53 exceeds a certain predetermined temperature and to open this circuit whenever the temperature of the water is under this predetermined temperature.

With the electric circuit 69, I also combine the solenoid 73 energized by the circuit whenever both switches 70 and 72 are closed. This solenoid 73 in turn operates the water valve 74 in conduit 54 whenever it is energized, i. e. the valve 74 is open whenever the circuit 69 is closed and motor 39 operates, and the valve 74 is closed whenever the motor 39 is in standstill.

Finally, I provide in the gas conduit 56 a valve 75 connected with the thermostatic switch means 72 in such a manner as to reduce the flow of gas through the conduit 56 whenever the temperature of the water at the end of the water coil 53 reaches a certain predetermined temperature and to automatically increase the flow of gas whenever the temperature of the water declines under this predetermined temperature.

It should be mentioned that the driving belt 42 not only rotates the pulley 41 and the conveyor screw 23, but also rotates by means of the additional pulleys 76, 77 and 78 the grinding rollers 30 and the smooth rollers 31, respectively.

My new apparatus described above in detail operates as follows:

When my machine is installed, it is necessary to adjust manually the water valve 59 determining the amount of water supply according to the available gas supply, and the shutter 28 determining the amount of coffee beans ground and supplied into the extraction vessel 22. Such adjustment is necessary since the quality of the used coffee beans varies within wide limits, the pressure of the heating gas and the water supply are variable too, and the requirement as to the quality of the coffee liquid, i. e. the concentration and strength of the same depend upon the user.

In order to obtain proper regulation, first of all the gas valve 58 is entirely opened and the water valve 59 manually adjusted so as to obtain through the water conduit 34 delivery of hot water of the desired temperature.

Then, the position of the shutter 28 is manually adjusted until coffee of desired strength is obtained. After these basic adjustments, the apparatus is ready for operation and will operate entirely automatically whenever the main switch 79 is closed.

Assumed the main switch 79 is closed at a time when there is little coffee liquid in the coffee container 62 and the temperature in the water coil 53 is below the temperature needed for obtaining proper coffee liquid, then the motor 39 will not operate; this is due to the fact that switch 72 will stay open interrupting the electric circuit 69. However, simultaneously with closing of the main switch 79, the pilot light 57 is lighted and the gas valve 58 is opened. This will result in operation of the gas heater 55 due to the fact that the automatic valve 75 is open too. The gas heater 55 will automatically operate until the water within the water coil 53, particularly at the upper end thereof, reaches the predetermined temperature. At this moment, the valve 75 will be partly closed, reducing the heating effect.

At the moment the water reaches the predetermined temperature, the switch 72 will be closed, resulting in operation of the motor 39. The motor 39 will operate and drive the grinding means 30 for the coffee beans, the smooth rollers 31, the extraction vessel 22 and the conveyor screw 23 until the level of the coffee liquid in the coffee container 62 rises to the predetermined upper level; this causes float 71 to open the switch 70. This, in turn, causes interruption of the circuit 69 and stopping of motor 39. The motor 39 will remain in standstill until the coffee level in the container 62 drops to the predetermined lower level at which moment switch 70 will again be closed, causing resumption of operation of the motor and production of new liquid coffee.

In order to avoid delivery of insufficiently heated water into the extraction vessel during operation of my new machine, I provide, as set forth above, the automatic switch 72 which is closed only if and when the temperature of the water delivered through the outlet conduit 34 exceeds a certain predetermined temperature. If the water temperature drops below the predetermined temperature, the switch 72 is automatically opened and thereby circuit 69 interrupted, resulting in standstill of the motor 39 and closing of valve 74. Despite such standstill of the motor, however, the heating means will operate until the water reaches again the predetermined temperature at which moment switch 72 will automatically close and motor 39 will operate again.

Thus, it is evident that the machine can operate only if the coffee container is not filled and the water delivered into the extraction vessel 22 has the required predetermined temperature.

In order to prevent delivery of cold water during standstill of the motor 39, the solenoid 73 which is energized only during operation of the motor, operates the valve 74 so as to automatically close the water conduit 54 whenever motor 39 does not operate and to open it the moment motor 39 starts to operate.

If it is desired to stop operation of the machine, it is only necessary to open the main switch 79.

During operation of the machine, both the extraction vessel 22 and the conveyor screw 23 rotate at a relatively high speed, e. g. between 1,000 and 1,500 R. P. M. However, since the difference between their speeds is small, the conveyor screw 23 turns only slowly, e. g. at a speed of between 10 and 15 R. P. M., within the extraction vessel 22, slowly transporting the ground coffee-hot water mixture through the rotating extraction vessel.

Due to the fact that both the extraction vessel 22 and the conveyor screw 23 rotate at a relatively high speed, they will intimately mix the ground coffee and hot water, expediting extraction of the ground coffee. Furthermore, the moment the ground coffee-hot water mixture reaches that portion of the extraction vessel in which the outlet holes 45 are located, the centrifugal force will force the coffee liquid through these outlet holes so that the remaining coffee grounds are actually in a more or less dry state when they are delivered by means of the conveyor screw 23 through the outlet opening 44 into the outlet tube 51.

Figure 2:
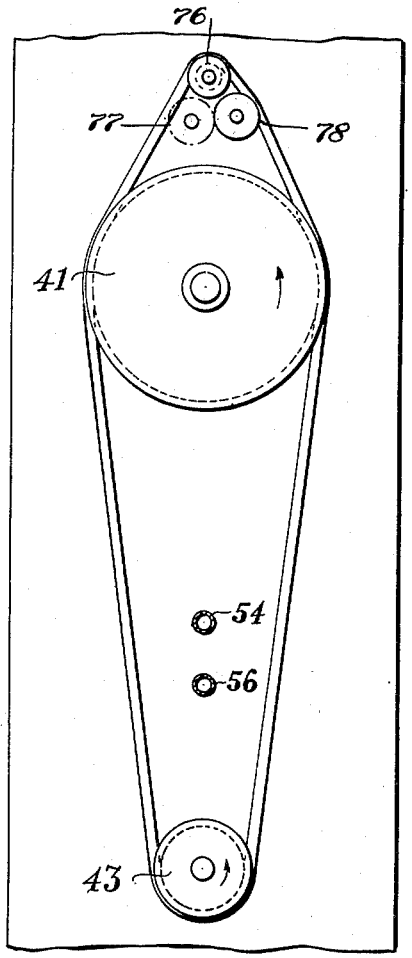
Fig. 2 is a cross section through the coffee making apparatus shown in Fig. 1, along line 2—2 of that figure.
Figure 4:
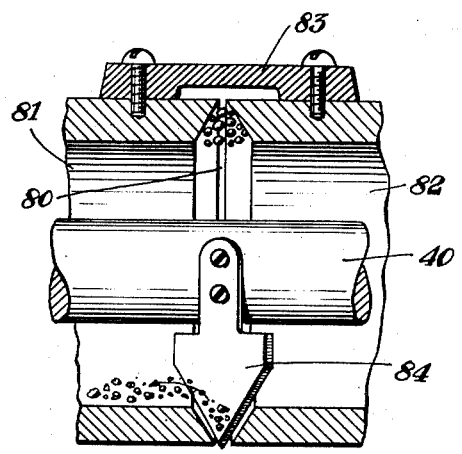
Fig. 4 is a longitudinal section through the extraction vessel of a modified coffee making apparatus provided with cleaning means for the slot through which the coffee liquid is emitted.

I wish to stress that in the embodiment of my present invention shown in Figs. 1 to 3, the outlet openings 45 are conical and shaped so that they are wider at their outer than at their inner ends. Contrary thereto, in the embodiment shown in Fig. 4, I provide as outlet opening an outlet slot 80 which is narrower at its outer than at its inner end. This lot is formed by interrupting the extraction vessel 22, i. e. making it of two parts 81 and 82 spaced from each other at a slight distance and connected only by four connecting bars 83, as shown. In order to clean this outlet slot, I provide a triangular plow-like member 84 secured to shaft 40 of the conveyor screw 23 and reaching into the slot as shown. This plow-like member slowly moves within the slot during operation of the machine and removes therefrom undesired ground coffee particles.

In Fig. 5 of the drawings I have shown a modified extraction vessel 85 provided with a plurality of outlet slots 86. I have found that such outlet slots have great advantages compared with outlet holes of the type shown in Fig. 1, since they do not get so easily clogged with coffee grounds and are easier to clean.

The vertical coffee making machine shown in Figs. 6 and 7 is similar in many respects to the coffee machine shown in Figs. 1 to 3 and equipped with coffee and hot water supplying means of the type shown in these figures. The main difference is that both the conical extraction vessel 87 as well as the conical conveyor screw 88 are rotating about a vertical axis. Also in this case the speed of the conveyor screw is slightly greater than the speed of the extraction vessel, so that the coffee grounds are transported by the conveyor screw slowly upward in direction of arrow 89 and emitted from the extraction vessel through the outlet opening 90. The ground coffee and hot water mixture is introduced into the extraction vessel through the inlet tube 91 and drops downward until it reaches the bottom 92 of this vessel. At the bottom of the extraction vessel, I provide the outlet conduit 93 for the finished coffee liquid which has the shape shown in Fig. 6. In order to regulate the suction created by this conduit 93 during rotation, I provide at the end thereof a screw-threaded tubular adjusting member 94. By turning this screw threaded member 94, it is possible to adjust the suction created by the conduit 93 within wide limits. The coffee liquid passing through the outlet conduit 93 drips into the stationary housing 95 and is emitted from the same through the coffee conduit 96.

This vertical coffee making machine operates as follows:

During rotation of the extraction vessel and the conveyor screw, the ground coffee-hot water mixture will be forced by centrifugal force to assume the position shown in Figs. 8 to 11. This means that when operation of the apparatus is started, the ground coffee-hot water mixture dripping through the inlet tube 91 will be forced outward and first fill the portion of the extraction vessel indicated in Fig. 6 by the reference numerals 97. After a certain time of operation, this portion of the extraction vessel will be filled and the water-coffee mixture in the extraction vessel will assume the shape shown in Fig. 8. In this position, no liquid coffee will yet leave the extraction vessel through the outlet conduit 93. If further ground coffee and hot water is introduced, the mixture of the same in the extraction vessel will assume the shape shown in Fig. 9. In this position, a permanent stream of hot coffee liquid will leave the extraction vessel through the outlet conduit 93. If the speed of rotation of the machine is slowed down and no further coffee and water is introduced into the extraction vessel, the level of the mixture will slowly drop, as indicated in Figs. 10 and 11, until no further liquid coffee leaves the extraction vessel through its outlet conduit 93.

The coffee grounds are transported during this operation upward in direction of arrow 89, as indicated in Fig. 6. Actually, as shown in Figure 7, the slot 98 left between the inner surface of the extraction vessel 87 and the conveyor screw 88 serves as filtering slot through which the liquid coffee has to pass in order to reach the bottom of the extraction vessel.

The modified vertical apparatus shown in Fig. 12 is basically identical with the one shown in Figs. 6 to 11. The only difference is that in this coffee maker the hot water and the ground coffee are introduced separately, namely the ground coffee through the elongated inlet tube 99 reaching nearly to the bottom of the extraction vessel 100 and the hot water through the inlet cup 101 provided with inlet holes 102 distributing the hot water near the upper end of the extraction vessel. Thus, in this embodiment of my coffee making apparatus, the ground coffee is moved upward by the conveyor screw 103 while the hot water is forced by gravity downward from one turn of the conveyor screw 103 to the other, and is filtered during each such step through the corresponding slot 104 between conveyor screw 103 and the extraction vessel 100.

The coffee making apparatus shown in Fig. 13 is basically identical with the one shown in Figs. 1 to 3. The main difference is that the axis of the extraction vessel 105 and of the conveyor screw 106 are inclined. Furthermore, in this apparatus the water is introduced through the inlet tube 107 reaching into shaft 108 of the conveyor screw 106, near the upper end of the cylindrical extraction vessel 105, while the ground coffee is introduced at the lower end of the extraction vessel by means of the inlet tube 109 as shown. During operation of this apparatus, the ground coffee is transported by the conveyor screw 106 upward in direction of arrow 110 while the hot water is moving due to gravity in opposite direction. The finished coffee liquid is leaving the inclined rotating extraction vessel through the outlet openings 111 provided at the lowermost point thereof.

I have found it advisable to provide means for adjusting the width of the helical slot formed between the outer edge of the conveyor screw 88 and the inner wall of the extraction vessel 87. These adjusting means consist in a screw threaded member 116 secured to the funnel-shaped upper end of the inlet tube 91 and cooperating with the screw threading provided on the inner surface of the cylindrical member 115. This cylindrical member 115 is freely turnably supported by the ball bearing 117 which in turn rests on the stationary support 118.

Thus, by screwing the screw threaded member 116 into the cylindrical member 115, it is possible to lower the inlet tube 91 and the conveyor screw 88 secured thereto, thereby increasing the width of the helical slot formed between this conveyor screw and the inner surface of the extraction vessel 87. If it is desired to reduce the width of this helical slot, it is only necessary to turn the screw threaded member 116 upward, thereby raising the inlet tube 91 and the conveyor screw 88 secured thereto, simultaneously reducing the width of the filter slot formed between this screw and the inner surface of the extraction vessel 87.

In the apparatus shown in Fig. 14, the inclined surface of the extraction vessel 112 is created by making the vessel conical. Of course, in this case it is necessary to use a conveyor screw 113 which is also conically shaped. In all other respects this apparatus is identical with the apparatus described in the preceding paragraph.

Fig. 15 shows a very simple way of providing the outlet openings. The same are arranged in the conical cap portion 114 screwed to the main extraction vessel 105 and 112, respectively.

It will be understood that each of the elements described above, or two or more together, may also find a useful application in other types of coffee making apparatus, differing from the types described above.

While I have illustrated and described the invention as embodied in rotatable coffee making apparatus, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In a coffee making apparatus in combination a rotatable cylindrical extraction vessel; at least one inlet opening at at least one end thereof; at least one coffee grounds outlet opening at at least one end thereof; at least one arcuate outlet slot for the liquid coffee arranged in the cylindrical wall of said rotatable cylindrical extraction vessel in a plane being normal to the axis of rotation of said cylindrical extraction vessel; means for rotating said rotatable cylindrical extraction vessel about its axis of rotation; means for continuously supplying a stream of ground coffee through an inlet opening into said rotatable cylindrical extraction vessel; means for continuously supplying a stream of hot water through an inlet opening into said rotatable cylindrical extraction vessel; a rotatable conveyor screw arranged within said rotatable cylindrical extraction vessel coaxially with the same; and means for rotating said rotatable conveyor screw about its axis of rotation at a speed being different from the speed of rotation of said rotatable cylindrical extraction vessel in such a manner as to intimately mix said hot water with said ground coffee and to transport at least said ground coffee through said rotatable cylindrical extraction vessel in longitudinal direction thereof transforming it during such transportation into coffee grounds and removing said coffee grounds from said rotatable cylindrical extraction vessel through said arcuate outlet slot while the hot water is transformed into coffee liquid which is emitted from said rotatable cylindrical extraction vessel through said coffee liquid outlet opening.

2. In a coffee making apparatus in combination a rotatable cylindrical extraction vessel; at least one inlet opening at at least one end thereof; at least one coffee grounds outlet opening at at least one end thereof; at least one arcuate groove-shaped outlet slot for the liquid coffee arranged in the cylindrical wall of said rotatable cylindrical extraction vessel and being wider on the inner face of said extraction vessel than on the outer face thereof; means for rotating said rotatable cylindrical extraction vessel about its axis of rotation; means for continuously supplying a stream of ground coffee through an inlet opening into said rotatable cylindrical extraction vessel; means for continuously supplying a stream of hot water through an inlet opening into said rotatable cylindrical extraction vessel; a rotatable conveyor screw arranged within said rotatable cylindrical extraction vessel coaxially with the same; and means for rotating said rotatable conveyor screw about its axis of rotation at a speed being different from the speed of rotation of said rotatable cylindrical extraction vessel in such a manner as to intimately mix said hot water with said ground coffee and to transport at least said ground coffee through said rotatable cylindrical extraction vessel in longitudinal direction thereof transforming it during such transportation into coffee grounds and removing said coffee grounds from said rotatable cylindrical extraction vessel through said arcuate groove-shaped outlet slot while the hot water is transformed into coffee liquid which is emitted from said rotatable cylindrical extraction vessel through said coffee liquid outlet opening.

3. In a coffee making apparatus in combination a rotatable cylindrical extraction vessel; at least one inlet opening at at least one end thereof; at least one coffee grounds outlet opening at at least one end thereof; at least one arcuate outlet slot for the liquid coffee arranged in the cylindrical wall of said rotatable cylindrical extraction vessel in a plane being normal to the axis of rotation of said cylindrical extraction vessel; means for rotating said rotatable cylindrical extraction vessel about its axis of rotation; means for continuously supplying a stream of ground coffee through an inlet opening into said rotatable cylindrical extraction vessel; means for continuously supplying a stream of hot water through an inlet opening into said rotatable cylindrical extraction vessel; a rotatable conveyor screw arranged within said rotatable cylindrical extraction vessel coaxially with the same; means for rotating said rotatable conveyor screw about its axis of rotation at a speed being different from the speed of rotation of said rotatable cylindrical extraction vessel in such a manner as to intimately mix said hot water with said ground coffee and to transport at least said ground coffee through said rotatable cylindrical extraction vessel in longitudinal direction thereof transforming it during such transportation into coffee grounds and removing said coffee grounds from said rotatable cylindrical extraction vessel through said arcuate outlet slot while the hot water is transformed into coffee liquid which is emitted from said rotatable cylindrical extraction vessel through said coffee liquid outlet opening; and stationary cleaning means adapted to direct a stream of water from outside against said outlet slot during rotation of said rotatable cylindrical extraction vessel so as to clean said slot from coffee grounds.

4. In a coffee making apparatus in combination a rotatable cylindrical extraction vessel; at least one inlet opening at at least one end thereof; at least one coffee grounds outlet opening at at least one end thereof; at least one arcuate groove-shaped outlet slot for the liquid coffee arranged in the cylindrical wall of said rotatable cylindrical extraction vessel and being wider on the inner face of said extraction vessel than on the outer face thereof; means for rotating said rotatable cylindrical extraction vessel about its axis of rotation; means for continuously supplying a stream of ground coffee through an inlet opening into said rotatable cylindrical extraction vessel; means for continuously supplying a stream of hot water through an inlet opening into said rotatable cylindrical extraction vessel; a rotatable conveyor screw arranged within said rotatable cylindrical extraction vessel coaxially with the same; means for rotating said rotatable conveyor screw about its axis of rotation at a speed being different from the speed of rotation of said rotatable cylindrical extraction vessel in such a manner as to intimately mix said hot water with said ground coffee and to transport at least said ground coffee through said rotatable cylindrical extraction vessel in longitudinal direction thereof transforming it during such transportation into coffee grounds and removing said coffee grounds from said rotatable cylindrical extraction vessel through said coffee grounds outlet opening while the hot water is transformed into coffee liquid which is emitted from said rotatable cylindrical extraction vessel through said arcuate groove-shaped outlet slot; and cleaning means secured to said conveyor screw and reaching into said groove-shaped outlet slot so as to clean the same during rotation of said conveyor screw.

OCTAVIO JOSE ALVAREZ.

REFERENCES CITED

The following references are of record in the file of this patent:

UNITED STATES PATENTS

| Number | Name | Date |
|---|---|---|
| 937,172 | Pearson | Oct. 19, 1909 |
| 1,268,858 | Lewis | June 11, 1918 |
| 1,813,575 | Janecke et al. | July 7, 1931 |
| 2,149,270 | Burgess | Mar. 7, 1939 |
| 2,183,837 | Hamilton et al. | Dec. 19, 1939 |
| 2,381,965 | Berry | Aug. 14, 1945 |

FOREIGN PATENTS

| Number | Country | Date |
|---|---|---|
| 19,259 | Holland | Jan. 15, 1929 |
| 77,877 | Sweden | July 25, 1933 |